Patented Nov. 5, 1946

2,410,433

UNITED STATES PATENT OFFICE 2,410,433

DRY ROSIN SIZE AND METHOD OF MAKING THE SAME

Arthur C. Dreshfield, Wilmington, Del., assignor to Hercules Powder Company, Wilmington, Del., a corporation of Delaware No Drawing. Application June 14, 1941,
Serial No. 398,065

5 Claims. (Cl. 260—105)

This invention relates to the manufacture of rosin size, and in particular concerns an improved method of making dry saponified rosin size and the new and improved product thereby obtained.

At the present time, the manufacture of dry rosin size is carried out by treating molten rosin with aqueous caustic alkali, i. e., sodium hydroxide, at elevated temperatures and pressures until saponification of the rosin acids is substantially complete and thereafter spray-drying the mixture to form the well-known substantially neutral, light, dry rosin size of commerce. While this method of manufacture has proven satisfactory from an operating standpoint, it has been recognized that important manufacturing economies could be realized by substituting inexpensive sodium carbonate for the sodium hydroxide. However, all attempts to make such substitution have heretofore proved unsuccessful since it was found that the reaction does not go to completion and that at the elevated pressures employed it is impossible to vent off the large quantities of carbon dioxide which are released during the reaction without discharging a considerable portion of the mixture of rosin and aqueous sodium carbonate undergoing reaction.

Accordingly, it is an object of the present invention to provide a method whereby advantage may be taken of the heretofore recognized but unattained manufacturing economies in the production of dry rosin size.

Another object is to provide a method whereby a part of the sodium hydroxide now employed in the manufacture of dry rosin size is replaced with sodium carbonate.

Other objects will be apparent from the following detailed description of the invention, and various advantages not referred to herein will occur to those skilled in the art upon employment of the invention in practice.

I have found that the above objects and attendant advantages may be realized by first partially saponifying the rosin at atmospheric pressure with aqueous sodium carbonate to obtain a high free rosin paste-type size, and thereafter completing the saponification by reacting the latter product with aqueous sodium hydroxide under super-atmospheric pressure and spray-drying the substantially completely saponified product in the usual manner. By operating in this manner, as much as 80 percent of the relatively expensive sodium hydroxide ordinarily required for the manufacture of dry rosin size may be replaced with inexpensive sodium carbonate. Moreover, since the reaction with sodium carbonate is carried out under atmospheric pressure in an open vessel, the carbon dioxide passes off continuously as it is formed and the operating difficulties heretofore experienced in attempting to employ sodium carbonate under pressure are avoided.

The saponification reaction with sodium carbonate takes place according to the equation:

$$2\ R\text{—COOH} + Na_2CO_3 \rightarrow 2\ R\text{—COONa} + CO_2 + H_2O$$

wherein R represents the rosin acid nucleus, until there is reached a point at which the reverse reaction begins to take place with resultant formation of sodium carbonate and bicarbonate. Since these latter compounds decompose to form carbon dioxide under the conditions of the subsequent reaction with sodium hydroxide, the sodium carbonate saponification should not be carried beyond the point where formation of carbonate and bicarbonate begins to take place. This point varies somewhat with the particular type of rosin employed and the conditions under which the reaction is carried out, but in general is reached when about 80 percent of the rosin has been saponified. Accordingly, only about 80 percent of the sodium carbonate theoretically required for complete saponification should be employed for the initial saponification reaction. In large scale operation it has been found preferable to employ a somewhat lower proportion, e. g., from about 65 to about 75 percent of the theoretical.

The sodium carbonate saponification reaction is conveniently carried out in the same general manner as that ordinarily employed in manufacturing paste sizes. Such mode of operation consists simply in heating a mixture of solid or molten rosin and aqueous sodium carbonate in an open vessel until carbon dioxide is no longer evolved from the mixture and the desired consistency or solids content is attained. The rosin may be either gum rosin, such as is obtained from living pine trees, or it may be wood rosin, such as is extracted from dead pine stump wood and the like. When the latter is employed it is preferably first subjected to a refining process, such as distillation under reduced pressure, selective solvent refining as with furfural or phenol, or treatment with fuller's earth, activated carbon, or the like. As will appear hereinafter, a type of rosin which has been found particularly suited for use according to the invention is the product obtained by subjecting refined wood rosin to heat-treatment at 250°–350° C. Mixtures of various types of wood and gum rosins may also be employed.

As stated above, in order that the product which is to be subsequently treated with sodium hydroxide under increased pressure may be substantially free from carbonate and bicarbonate, the sodium carbonate is employed in an amount sufficient to saponify at most only about 80 percent, preferably 65–75 percent, of the rosin. The exact proportion varies with the alkali requirement of the particular rosin employed but for ordinary wood or gum rosin is usually between about 10 and about 12 percent by weight of the rosin. The heat-treated rosin mentioned above has a somewhat lower alkali requirement, and accordingly a lower proportion of sodium carbonate, e. g., about 9 percent by weight of the rosin, is used when this type of rosin is employed. The concentration of the aqueous sodium carbonate solution is preferably between about 25 and about 30 percent by weight in order that upon completion of the reaction the product will contain between about 80 and about 85 percent solids. If desired, however, somewhat more dilute solutions may be employed, and the desired solids content adjusted after completion of the reaction by evaporating off the excess water.

The product obtained by partially saponifying rosin with sodium carbonate as described above is a typical high free rosin soda-cooked paste size which is substantially free from carbonates and bicarbonates and which contains between about 20 and about 35 percent by weight of free rosin on a dry basis. If desired, this product may be stored indefinitely before further processing with sodium hydroxide to form the dry size, although if it has been prepared from wood rosin it may show a strong tendency to precipitate an insoluble double salt of sodium abietate and abietic acid, known in the art as "3:1 salt," upon storage. However, paste sizes prepared from gum rosin or the above-mentioned heat-treated wood rosin do not tend to form 3:1 salt upon storage, and accordingly it is preferable to employ these types of rosin, particularly the latter, when some time may elapse between the initial and final stages of the process.

The final saponification reaction and subsequent drying operation may be carried out in any of a number of well-known ways, a particularly convenient mode of operation being similar to that described in U. S. Patent No. 2,134,911. Such method consists in introducing the paste size into an autoclave where it is heated under pressure to a temperature of about 120°–155° C., and thereafter forcing a hot aqueous sodium hydroxide solution of 30–50 percent by weight concentration into the autoclave while maintaining the mixture at a reaction temperature of about 135°–180° C. and under its autogenic pressure. Heating is continued until the reaction is complete, after which the mixture is allowed to discharge under its own pressure into a drying chamber, whereby it is instantly desiccated to form a dry, non-caking powder.

The amount of sodium hydroxide required to complete the saponification depends upon the proportion of free rosin in the soda-cooked paste as well as upon the alkali requirement of the rosin itself. Ordinarily, however, where the paste contains from about 20 to about 35 percent by weight of free rosin, from about 2.4 to about 4.2 percent by weight of sodium hydroxide, based on the weight of rosin employed in preparing the paste, will be required to secure substantially complete saponification.

The following examples will illustrate several ways in which the principle of the invention has been applied, but are not to be construed as limiting the same.

*Example I*

A molten mixture of 150 lbs. of I wood rosin and 50 lbs. of G gum rosin was mixed with 20 lbs. of sodium carbonate in the form of a 25 percent by weight aqueous solution in an injector-type mixing T, and the mixture was introduced into 110-gallon open digester which was heated at the bottom by means of a steam coil. The mixture was heated at a temperature of about 85° C. for 3 hours, whereby there was obtained a paste size having the following analysis:

|  | Percent |
|---|---|
| Total solids | 87.3 |
| Free rosin (dry basis) | 38.5 |
| $Na_2CO_3$ (dry basis) | 0.00 |
| $NaHCO_3$ (dry basis) | 0.17 |

This product was pumped directly from the digester to an oil-jacketed vertical autoclave where it was heated under pressure to a temperature of about 150° C. by circulating hot oil through the jacket. Approximately 23.8 lbs. of a 39 percent aqueous sodium hydroxide solution (4.6 percent by weight based on the total rosin taken) which had been heated to a temperature of about 132° C. was then forced in at the bottom of the autoclave. The mixture was heated at 150°–178° C. for 20 minutes, after which it was allowed to discharge under a pressure of about 110 lbs./sq. in. into an atmospheric drying chamber. The size so prepared was a light dry powder containing 94.7 percent by weight of solids, of which 0.2 per cent was free rosin.

*Example II*

Approximately 2,800 lbs. of sodium carbonate was dissolved in 790 gallons of water in a mixing tub, and the resultant solution was transferred to an 8,000-gallon steam-heated digester and heated to a temperature of about 90° C. A mixture of 7,500 lbs. of N heat-treated wood rosin, 7,500 lbs. of G gum rosin, and 15,000 lbs. of I heat-treated wood rosin was then loaded into the digester over a period of 2¼ hours, and the mixture was heated at a temperature of about 86° C. for about 4½ hours. The sodium carbonate mixing tub was rinsed out with 150 gallons of water which was then added to the digester, and heating was continued for 12 hours. The product so obtained was a typical high free rosin soda-cooked paste size which contained about 83.5 percent total solids, of which about 35.8 percent was free rosin. This product was processed to dry size in twelve separate batches by cooking with aqueous sodium hydroxide under pressure and spray-drying as described in Example I. The operating details for each of the twelve batches, together with the analysis of the products, are summarized in the following table. The analysis of a typical commercial dry size is included for purposes of comparison.

Table

| Batch No. | Reactants | | Reaction | | | Product | | |
|---|---|---|---|---|---|---|---|---|
| | Paste size, lbs. | NaOH, lbs. | Temp., °C. | Time, hrs. | Wt., lbs. | Solids, per cent | Free alkali, per cent | Free rosin, per cent |
| 1 | 1,980 | 99.0 | 152–176 | 1.58 | 1,550 | 97.1 | 0.00 | 0.4 |
| 2 | 1,980 | 88.9 | 146–176 | 1.00 | 1,650 | 94.3 | 0.00 | 0.6 |
| 3 | 2,223 | 81.5 | 150–176 | 0.83 | 1,750 | 96.9 | 0.15 | 0.0 |
| 4 | 4,132 | 172.0 | 120–176 | 2.75 | 4,300 | 96.4 | 0.18 | 0.0 |
| 5 | 1,980 | 89.5 | 140–176 | 1.17 | 1,950 | 97.8 | 0.00 | 0.6 |
| 6 | 2,178 | 89.5 | 135–176 | 1.42 | 1,950 | 95.8 | 0.16 | 0.0 |
| 7 | 2,214 | 89.5 | 143–176 | 1.00 | 1,900 | 97.2 | 0.18 | 0.0 |
| 8 | 4,140 | 180.0 | 135–193 | 2.25 | 3,400 | 97.8 | 0.00 | 0.5 |
| 9 | 1,980 | 82.3 | 132–176 | 1.00 | 1,500 | 96.1 | 0.03 | 0.0 |
| 10 | 1,980 | 74.0 | 124–176 | 1.08 | 1,950 | 95.9 | 0.00 | 0.0 |
| 11 | 1,980 | 74.0 | 127–176 | 1.00 | 1,750 | 96.4 | 0.07 | 0.0 |
| 12 | 1,980 | 74.0 | 140–176 | 0.92 | 2,200 | 95.5 | 0.11 | 0.0 |
| Typical commercial dry size | | | | | | 97.8 | 0.05 | 0.01 |

While the invention has been described above with respect to the use of sodium carbonate and sodium hydroxide, respectively, as the saponifying agents, it will be apparent to those skilled in the art that the same advantages may be realized employing other alkali-metal carbonates and hydroxides. For example, if it is desired to produce a potassium dry size, potassium carbonate may be substituted for a part of the potassium hydroxide ordinarily employed. Also, while it is contemplated that most size manufacturers will prefer to carry out both stages of the new process, it will be realized that if desired a high free rosin soda-cooked paste size which is substantially free from carbonates may be purchased on the open market and processed to dry size as herein described.

Other modes of applying the principle of my invention may be employed instead of those explained, change being made as regards the method herein disclosed or the materials employed, provided the step or steps stated by any of the following claims be employed or the product defined by any of the following claims be obtained.

What I claim and desire to protect by Letters Patent is:

1. The method of making a dry saponified rosin size which comprises saponifying a rosin under substantially atmospheric pressure with a concentrated aqueous solution of an alkali metal carbonate to an extent not more than about 80% of theoretical complete saponification, to form a concentrated paste size which is substantially free of carbonates, subsequently saponifying said paste size with a concentrated aqueous solution of an alkali metal hydroxide in an amount adapted to provide a substantially neutral saponified rosin size, at a temperature between about 135° C. and about 180° C. and under autogenic pressure, and then discharging the said saponified mixture at said temperature and under said pressure into a drying zone maintained at substantially atmospheric pressure, whereby there is produced a dry, non-caking, substantially neutral size.

2. The method of preparing a dry saponified rosin size which comprises heating a rosin under substantially atmospheric pressure with a concentrated aqueous solution of an alkali metal carbonate in an amount between about 65% and about 75% of the alkali metal carbonate theoretically required for complete saponification of the rosin, to form a paste size substantially free from carbonates and which contains between about 80% and about 85% solids by weight, subsequently heating said paste size with a concentrated aqueous solution of an alkali-metal hydroxide in an amount adapted to provide a substantially neutral saponified rosin size, at a temperature between about 135° C. and about 180° C. and under autogenic pressure, and then discharging the said saponified mixture at said temperature and under said pressure into a drying zone maintained at substantially atmospheric pressure, whereby there is produced a dry, non-caking, substantially neutral size.

3. The method of making a dry saponified rosin size which comprises saponifying a rosin under substantially atmospheric pressure with an alkali metal carbonate in the form of an aqueous solution having a concentration between about 25% and about 30% by weight, in an amount sufficient to saponify between about 65% and about 75% by weight of the rosin, to form a concentrated paste size which is substantially free from carbonates and which contains between about 80% and about 85% solids by weight, subsequently saponifying said paste size at a temperature between about 135° C. and about 180° C. and under autogenic pressure, with an alkali-metal hydroxide in the form of an aqueous solution having a concentration between about 30% and about 50% by weight, in an amount adapted to provide a substantially neutral, saponified rosin size, and then discharging the saponified mixture at said temperature and under said autogenic pressure into a drying zone maintained at substantially atmospheric pressure, whereby there is produced a dry, non-caking, substantially neutral, pulverulent, saponified rosin size.

4. The method of preparing a dry saponified rosin size which comprises heating a rosin under substantially atmospheric pressure with a concentrated aqueous sodium carbonate solution in an amount sufficient to saponify not more than about 80% of the rosin, to form a paste size which is substantially free from carbonates and which contains between about 80% and 85% solids by weight, subsequently substantially completely saponifying said paste size with an aqueous sodium hydroxide solution having a concentration between about 30% and about 50% by weight, at a temperature between about 135° C. and about 180° C. and under autogenic pressure, and then discharging the concentrated saponified paste size at said temperature and under said autogenic pressure into a drying zone maintained at substantially atmospheric pressure, whereby there is produced a dry, non-caking, substantially neutral size.

5. The method of preparing a dry saponified rosin size which comprises saponifying a heat-treated rosin under atmospheric pressure with a concentrated aqueous sodium carbonate solution in an amount sufficient to saponify not more than about 80% of the rosin, thereby providing a paste size which is substantially free from carbonates and which contains between about 80% and about 85% solids by weight, subsequently substantially completely saponifying said paste size with an aqueous sodium hydroxide solution having a concentration between about 30% and about 50% by weight, at a temperature between about 135° C. and about 180° C. and under autogenic pressure, and then discharging the concentrated saponified paste size at said temperature and under said autogenic pressure into a drying zone maintained at substantially atmospheric pressure, whereby there is produced a dry, non-caking, substantially neutral size.

ARTHUR C. DRESHFIELD.